Nov. 2, 1937.   R. PALMER   2,098,062
CARBON BRUSH
Filed April 26, 1935
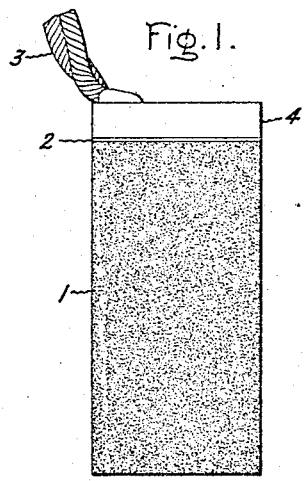
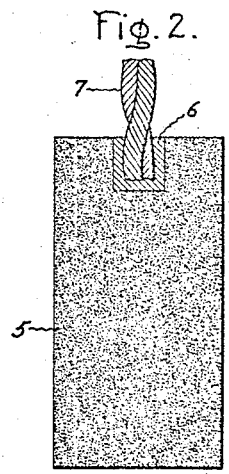
Inventor:
Robert Palmer,
by Harry E. Dunham
His Attorney.

UNITED STATES PATENT OFFICE 2,098,062

CARBON BRUSH

Robert Palmer, Niskayuna, N. Y., assignor to General Electric Company, a corporation of New York Application April 26, 1935, Serial No. 18,374

5 Claims. (Cl. 171—325)

The present invention relates to a method for joining carbon to metal and more particularly to carbon brushes, and means for integrally securing a metal thereto. Heretofore carbon brushes have been electroplated to provide a low resistance connection between the carbon brush and the ordinary flexible or braided connector employed to conduct current to and from the brush, or the brush has been mechanically fastened to a lower resistance conductor either by a rivet, tamped powder or plastic material. It has also been customary to provide an opening in the carbon brush which opening has been filled with solder into which the flexible conductor has been embedded or to cast metal caps onto the end of electroplated carbon brushes. In all these prior devices however the electrical contact between the carbon and metal has not been satisfactory since the metal in contact with the carbon has not penetrated beyond the surface of the carbon and as a result the contact has been one of relatively high resistance and the resistance may change with time and generally increases at relatively high temperatures.

In carrying out the present invention I secure to the carbon a metal which when molten or heated will "wet" or hold on to the carbon with adamantine tenacity. When a metal of this character is employed it not only impregnates the adjacent pores of the carbon but apparently forms a surface compound therewith. As a result the metal is integrally united with the carbon forming a strong bond therewith of extremely low resistance.

The novel features which are characteristic of the invention are set forth with particularity in the appended claims. The invention itself however will best be understood from reference to the following specification when considered in connection with the accompanying drawing in which Fig. 1 is a view in elevation of a carbon brush embodying the features of the present invention while Fig. 2 is a cross sectional view of a modified form of my invention.

In carrying out my invention, I apply molten cobalt to the upper surface of a carbon block or brush 1. The cobalt when molten wets the carbon and penetrates deeply into the pores thereof forming an intersurface compound with the carbon and providing an integral connection between the metal and carbon. An excess of cobalt may be employed so that the upper surface of the carbon brush is provided with a layer 2 of that metal to which a flexible conductor 3 may be secured in a manner well known in the art. If desired this connection may be obtained by soldering or brazing a copper plate 4 to the cobalt plate 2 and then brazing or soldering a flexible conductor 3 to the copper plate 4 as indicated in Fig. 1.

Instead of forming a cobalt plate extending over the entire upper surface of the brush I may drill a hole in the top of a carbon block or brush 5 which may be filled with molten cobalt 6 into which a flexible conductor 7 may be inserted and thereby rigidly secured to the carbon brush.

While my invention, owing to the very low electrical resistance which may be obtained between the cobalt and carbon, is particularly adapted for use in connection with carbon commutator brushes, it is not limited to use in such devices. Furthermore, although I have described the invention in connection with the metal cobalt, other metals which have the property when molten of wetting carbon may be employed if desired, for example a nickel alloy which contains varied amounts of iron and metal from a group consisting of tungsten and molybdenum.

What I claim as new and desire to secure by Letters Patent of the United States, is:

1. In combination, a carbon block, a metal coating integrally united therewith, said metal when molten having the property of wetting carbon.

2. A carbon brush having a metallic coating thereon, a portion of said metal being alloyed with said carbon.

3. A carbon brush, some of the pores of said brush being impregnated with cobalt.

4. A carbon brush having a coating of cobalt thereon, the pores of said brush adjacent said coating being impregnated with cobalt.

5. In combination, a carbon block and a metal secured to a portion of said block, said metal when molten having the property of wetting said carbon, the quantity of said metal employed being in excess of that required to impregnate the pores of said block adjacent said metal.

ROBERT PALMER.